United States Patent
Yang

(10) Patent No.: US 9,812,882 B2
(45) Date of Patent: Nov. 7, 2017

(54) INTERNET DEVICE AND AUTOMATIC SWITCHING METHOD, APPARATUS AND CIRCUIT FOR CHARGING INTERFACE OF INTERNET DEVICE

(75) Inventor: Liang Yang, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 772 days.

(21) Appl. No.: 14/113,321

(22) PCT Filed: Nov. 21, 2011

(86) PCT No.: PCT/CN2011/082552
§ 371 (c)(1),
(2), (4) Date: Oct. 22, 2013

(87) PCT Pub. No.: WO2012/159427
PCT Pub. Date: Nov. 29, 2012

(65) Prior Publication Data
US 2014/0084852 A1 Mar. 27, 2014

(30) Foreign Application Priority Data

May 20, 2011 (CN) .......................... 2011 1 0132560

(51) Int. Cl.
*H02J 7/00* (2006.01)
*G06F 1/26* (2006.01)
*H02J 1/10* (2006.01)

(52) U.S. Cl.
CPC ............ *H02J 7/0052* (2013.01); *G06F 1/263* (2013.01); *H02J 7/0036* (2013.01); *H02J 7/0055* (2013.01); *H02J 1/10* (2013.01); *Y10T 307/74* (2015.04)

(58) Field of Classification Search
CPC ....... Y02E 60/12; H02J 7/0042; H02J 7/0045; H01M 10/44; H01M 10/46
(Continued)

(56) References Cited

U.S. PATENT DOCUMENTS 7,013,163 B2 * 3/2006 Jaggers ................. H02J 7/0044
361/679.21
2006/0035527 A1 * 2/2006 Numano ............... G06F 1/3203
439/668
(Continued)

FOREIGN PATENT DOCUMENTS

CN 201146393 Y 11/2008
CN 201146398 Y 11/2008
(Continued)

OTHER PUBLICATIONS

European Search Report for corresponding application EP 11 86 6219; Report dated Nov. 6, 2016.
(Continued)

Primary Examiner — Richard Isla Rodas
Assistant Examiner — Mohammed J Sharief
(74) Attorney, Agent, or Firm — Cantor Colburn LLP

(57) ABSTRACT

An internet device and an automatic switching method, apparatus and circuit for a charging interface of an internet device are disclosed. The device includes a device charging interface (20), a dock charging interface (30), a charging loop (40) and an automatic switching apparatus (10) for a charging interface. The method includes: when external power supply is connected into the device (S001), judging whether a dock charging interface a the device is in place (S002), if so, isolating a device charging interface of the device and at the same time, connecting a charging loop of the device through a dock charging interface of the device (S003); otherwise, isolating the dock charging loop of the device and at the same time, connecting the charging loop of the device through the device charging interface of the device (S004). The device is convenient to implement and has the advantages of reliable performance and low cost.

4 Claims, 3 Drawing Sheets

(58) Field of Classification Search
USPC .......................................................... 320/107
See application file for complete search history.

(56) References Cited

U.S. PATENT DOCUMENTS

| | | | |
|---|---|---|---|
| 2009/0015198 A1 | 1/2009 | Brandenburg | |
| 2009/0102427 A1 | 4/2009 | Tamegai et al. | |
| 2009/0309426 A1* | 12/2009 | Hsieh ................... | H02J 7/0068 307/113 |
| 2010/0301674 A1 | 12/2010 | Lin | |
| 2013/0086397 A1* | 4/2013 | Uchida ................... | G06F 1/266 713/300 |

FOREIGN PATENT DOCUMENTS

| | | |
|---|---|---|
| CN | 102201697 A | 9/2011 |
| WO | 2010129369 A2 | 11/2010 |

OTHER PUBLICATIONS

Int'l Search Report issued Feb. 23, 2012 in Int'l Application No. PCT/CN2011/082552.

* cited by examiner

INTERNET DEVICE AND AUTOMATIC SWITCHING METHOD, APPARATUS AND CIRCUIT FOR CHARGING INTERFACE OF INTERNET DEVICE

CROSS-REFERENCE TO RELATED APPLICATION

This application is a Section 371 of International Application No. PCT/CN2011/082552, filed Nov. 21, 2012, which was published in the Chinese language on Nov. 29, 2012, under International Publication No. WO 2012/159427 A1, and the disclosure of which is incorporated herein by reference.

TECHNICAL FIELD

The disclosure relates to an internet device and an automatic switching technology for a charging interface of an internet device, in particular to an internet device, and an automatic switching method, apparatus and circuit for a charging interface of an internet device.

BACKGROUND

With the popularization of the handheld internet devices, it becomes a trend to provide the handheld internet devices with various charging ways. For example, a dock charging interface is further integrated on the Dock of a handheld internet device besides a device charging interface (generally a Micro USB (Universal Serial Bus) interface) provided by the handheld internet device. Whereas, the handheld internet device is generally provided with only one charging loop, so a method of avoiding simultaneous use of multiple charging ways by structure is generally adopted in the conventional solution, namely, a user cannot use the device charging interface when the handheld internet device is placed on the dock, or, the dock is connected with the charging loop to avoid the problem of two power supplies. In this case, if the default charging interface of the handheld internet device is defined as the device charging interface, the user experience will be affected. For example, both iPAD of Apple and LePAD of Lenovo adopt the later to solve such a problem. At present, such a problem is basically solved by software, but there will be some risks, this is because much interference will be caused to the logic of the handheld internet device when the two charging interfaces coexist.

SUMMARY

The disclosure provides an internet device and an automatic switching method, apparatus and circuit for a charging interface of an internet device, so as to avoid interference generated during the charging of the internet device.

The disclosure provides an automatic switching method for a charging interface of an internet device, including:

when external power supply is connected into a device, judging whether a dock charging interface of the device is in place, if the dock charging interface of the device is in place, isolating a device charging interface of the device and at the same time, connecting a charging loop of the device through the dock charging interface of the device; otherwise isolating the dock charging interface of the device and at the same time, connecting the charging loop of the device through the device charging interface of the device.

Preferably, before judging whether the dock charging interface of the device is in place, the automatic switching method further includes:

detecting whether the external power supply is connected into the device.

The disclosure also provides an automatic switching apparatus for a charging interface of an internet device, the automatic switching apparatus includes a detection module and a switching module, wherein the detection module is configured to, when external power supply is connected into a device, judge whether a dock charging interface of the device is in place and send a judgment result to the switching module; and the switching module is configured to, when the dock charging interface of the device is in place, isolate a device charging interface of the device and at the same time, connect a charging loop of the device through the dock charging interface of the device; or, when the dock charging interface of the device is not in place, isolate the dock charging interface of the device and at the same time, connect the charging loop of the device through the device charging interface of the device.

Preferably, the detection module is further configured to detect whether the external power supply is connected into the device.

The disclosure also provides an internet device, including a device charging interface, a dock charging interface and a charging loop, further including an automatic switching apparatus for a charging interface, wherein the automatic switching apparatus for the charging interface includes a detection module and a switching module, wherein the detection module is configured to, when external power supply is connected into the device, judge whether the dock charging interface is in place and send a judgment result to the switching module; and the switching module is configured to, when the dock charging interface is in place, isolate the device charging interface and at the same time, connect the charging loop through the dock charging interface; or, when the dock charging interface is not in place, isolate the dock charging interface and at the same time, connect the charging loop through the device charging interface.

Preferably, the detection module is further configured to detect whether the external power supply is connected into the device.

The disclosure also provides an automatic switching circuit for a charging interface of an internet device, the automatic switching circuit includes a first diode, a second diode, a first resistor, a second resistor, a third resistor, a phase inverter, a first P Metal Oxide Semiconductor Field Effect Transistor (PMOSFET), a second PMOSFET and a third PMOSFET, wherein the anode of the first diode is connected with one end of the second resistor, the gate of the first PMOSFET and the drain of the second PMOSFET respectively; the cathode of the first diode is connected with one end of the first resistor; the other end of the first resistor is connected with the cathode of the second diode and the source of the first PMOSFET respectively; the drain of the first PMOSFET is connected with one end of the third resistor, the input end of the phase inverter and the gate of the second PMOSFET respectively; the output end of the phase inverter is connected with the gate of the third PMOSFET; the other end of the second resistor and the other end of the third resistor are grounded; and the anode of the second diode is connected with the drain of the third PMOSFET.

The disclosure also provides an internet device, including a device charging interface, a dock charging interface and a charging loop, further including an automatic switching circuit for a charging interface, wherein the automatic switching circuit includes a first diode, a second diode, a first resistor, a second resistor, a third resistor, a phase inverter, a first P Metal Oxide Semiconductor Field Effect Transistor (PMOSFET), a second PMOSFET and a third PMOSFET, wherein the anode of the first diode is connected with the dock charging interface, one end of the second resistor, the gate of the first PMOSFET and the drain of the second PMOSFET respectively; the cathode of the first diode is connected with one end of the first resistor; the other end of the first resistor is connected with the cathode of the second diode and the source of the first PMOSFET respectively; the drain of the first PMOSFET is connected with one end of the third resistor, the input end of the phase inverter and the gate of the second PMOSFET respectively; the output end of the phase inverter is connected with the gate of the third PMOSFET; the other end of the second resistor and the other end of the third resistor are grounded; the anode of the second diode is connected with the device charging interface and the drain of the third PMOSFET respectively; and the source of the second PMOSFET and the source of the third PMOSFET are connected with the input end of the charging loop.

According to the disclosure, a stand charger is preferred for charging and the other unused charging interface is isolated, so that the handheld internet device can select one charging way as required while avoiding interference from the other charging way. The internet device is reliable in performance, low in cost and convenient to be implemented, and its charging safety can be ensured without software.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

To make the technical problem to be solved by the disclosure, the technical solution and the beneficial effects more clear, the disclosure is further described below with reference to the drawings and embodiments in detail. It should be understood that the specific embodiments herein are only intended to explain the disclosure instead of limiting the disclosure.

Figure 1:
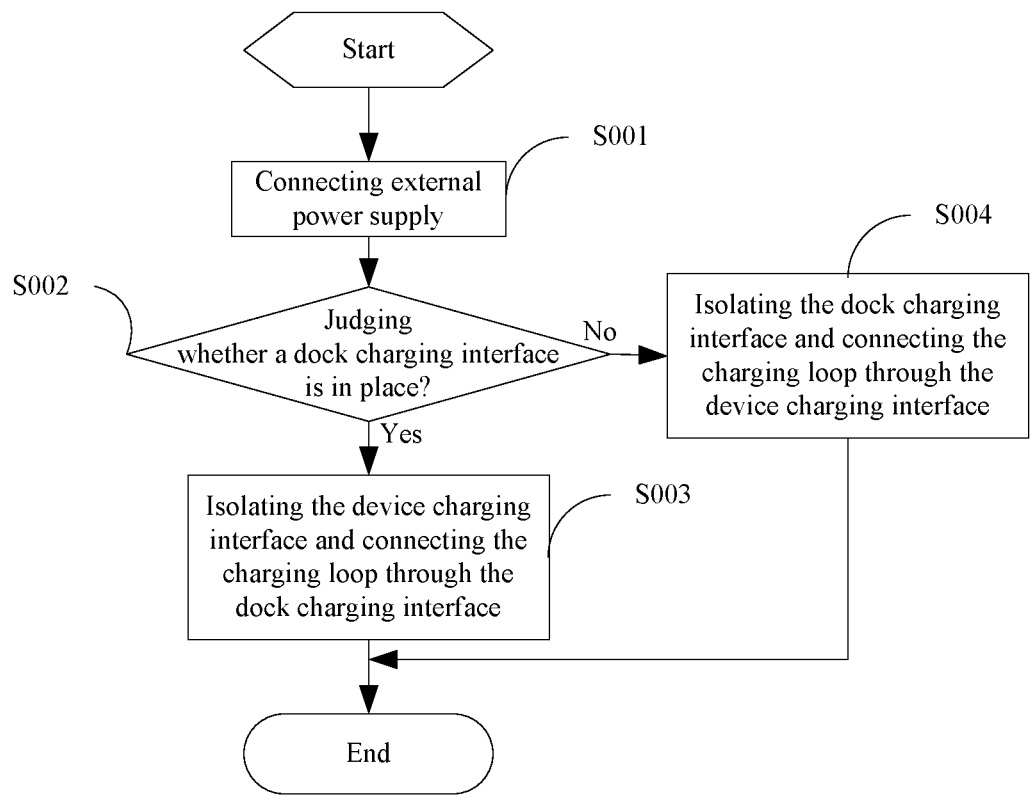
FIG. 1 is a diagram showing the flow of an automatic switching method for a charging interface of an internet device in an embodiment of the disclosure.

As shown in FIG. 1, which is a diagram showing the flow of an automatic switching method for a charging interface of an internet device in an embodiment of the disclosure, the embodiment includes the following steps.

Step S001: It is detected that external power supply is connected into the internet device.

Step S002: It is judged whether a dock charging interface of a device is in place, if so, executing Step S003, otherwise, executing Step S004.

In the embodiment of the disclosure, dock power supply is preferred as charging power supply. Since the dock itself is defined for charging the internet device and can provide a larger charging current than the device charging interface, the charging efficiency can be improved. Furthermore, when the dock charging interface is not in place, the device charging interface is connected automatically to meet the charging function when the dock charging interface is not in place.

Step S003: The device charging interface is isolated, and at the same time, a charging loop of the device is connected through the dock charging interface to charge the internet device.

Step S004: The dock charging loop is isolated, and at the same time, the charging loop of the device is connected through the device charging interface to charge the internet device.

Figure 2:
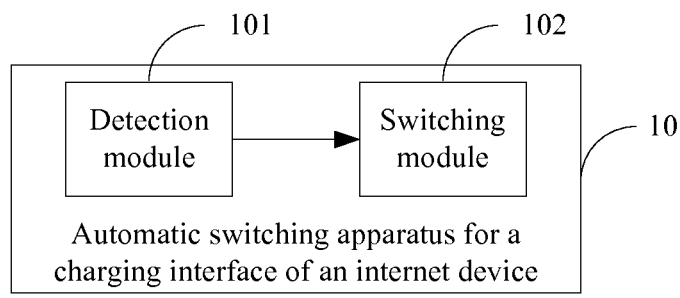
FIG. 2 is a block diagram showing the principle of an automatic switching apparatus for a charging interface of an internet device in an embodiment of the disclosure.

As shown in FIG. 2, which is a block diagram showing the principle of an automatic switching apparatus for a charging interface of an internet device in an embodiment of the disclosure, in the embodiment, the automatic switching apparatus 10 for a charging interface of the internet device includes a detection module 101 and a switching module 102, wherein the detection module 101 is configured to detect whether external power supply is connected into the device, if the external power supply is connected into the device, judge whether a dock charging interface of the device is in place and send a judgment result to the switching module 102; and the switching module 102 is configured to, when the dock charging interface of the device is in place, isolate a device charging interface of the device and at the same time, connect a charging loop of the device by the dock charging interface of the device; or, when the dock charging interface of the device is not in place, isolate the dock charging interface of the device and at the same time, connect the charging loop of the device by the device charging interface of the device.

Figure 3:
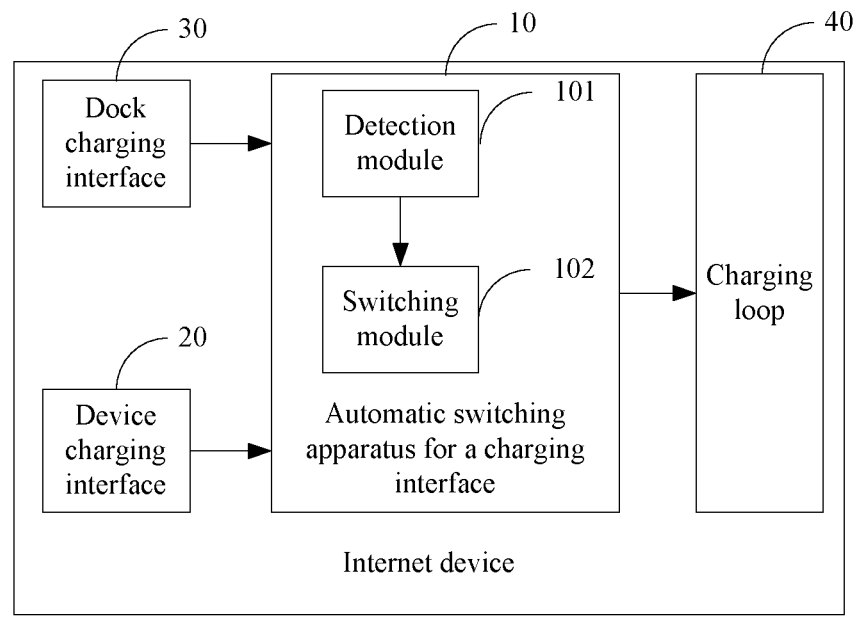
FIG. 3 is a block diagram showing the principle based on the internet device in FIG. 2 in an embodiment of the disclosure.

As shown in FIG. 3, which is a block diagram showing the principle based on the internet device in FIG. 2 in an embodiment of the disclosure, in the embodiment, the internet device includes a device charging interface 20, a dock charging interface 30, an automatic switching apparatus 10 for a charging interface and a charging loop 40, wherein the automatic switching apparatus 10 for a charging interface is connected with the device charging interface 20, the dock charging interface 30 and the charging loop 40 respectively and includes a detection module 101 and a switching module 102;

the detection module 101 is configured to detect whether external power supply is connected into the device, if the external power supply is connected into the device, judge whether the dock charging interface 30 is in place and send a judgment result to the switching module 102; and the switching module 102 is configured to, when the dock charging interface 30 is in place, isolate the device charging interface 20 and at the same time, connect the charging loop 40 through the dock charging interface 30; or, when the dock charging interface 30 is not in place, isolate the dock charging interface 30 and connect the charging loop 40 through the device charging interface 20.

Figure 4:
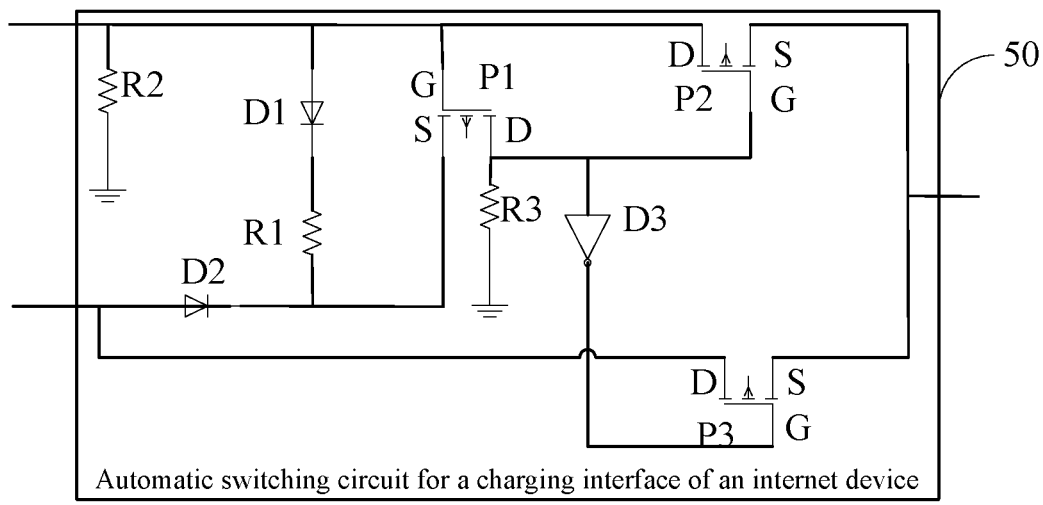
FIG. 4 is a diagram showing the principle of an automatic switching circuit for a charging interface of an internet device in an embodiment of the disclosure.

As shown in FIG. 4, which is a diagram showing the principle of an automatic switching circuit for a charging interface of an internet device in an embodiment of the disclosure, in the embodiment, an automatic switching circuit 50 for a charging interface of an internet device includes a first diode D1, a second diode D2, a first resistor R1, a second resistor R2, a third resistor R3, a phase inverter D3, a first PMOSFET P1, a second PMOSFET P2 and a third PMOSFET P3. The first diode D1 and the second diode D2 are mainly configured to isolate power. The first resistor R1 is configured to limit current; and the second resistor R2 and the third resistor R3 are configured to provide a signal default state. The phase inverter D3 is configured to control signal logic inversion. The first PMOSFET P1 is configured to generate a logic control signal; the second PMOSFET P2 is configured to control the connection/disconnection of the dock charging interface; and the third PMOSFET P3 is configured to control the connection/disconnection of the device charging interface.

The anode of the first diode D1 is connected with one end of the second resistor R2, the gate (G) of the first PMOSFET P1 and the drain (D) of the second PMOSFET P2 respectively; the cathode of the first diode D1 is connected with one end of the first resistor R1 of which the other end is connected with the cathode of the second diode D2 and the source (S) of the first PMOSFET P1 respectively; the drain of the first PMOSFET P1 is connected with one end of the third resistor R3, the input end of the phase inverter D3 and the gate of the second PMOSFET P2 respectively; the output end of the phase inverter D3 is connected with the gate of the third PMOSFET P3; the other ends of both the second resistor R2 and the third resistor R3 are grounded; and the anode of the second diode D2 is connected with the drain of the third PMOSFET P3.

Figure 5:
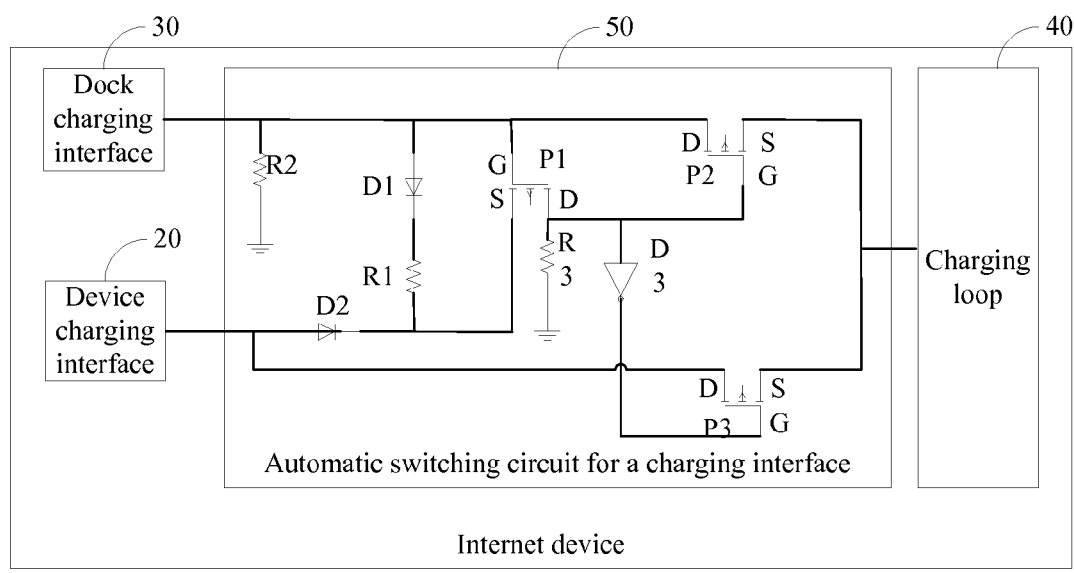
FIG. 5 is a block diagram showing the principle based on the internet device in FIG. 4 in an embodiment of the disclosure.

As shown in FIG. 5, which is a block diagram showing the principle based on the internet device in FIG. 4 in an embodiment of the disclosure, in the embodiment, the internet device includes a device charging interface 20, a dock charging interface 30, an automatic switching circuit 50 and a charging loop 40, wherein the automatic switching circuit 50 for the charging interface is connected with the device charging interface 20, the dock charging interface 30 and the charging loop 40 respectively and includes a first diode D1, a second diode D2, a first resistor R1, a second resistor R2, a third resistor R3, a phase inverter D3, a first PMOSFET P1, a second PMOSFET P2 and a third PMOSFET P3, wherein the anode of the first diode D1 is connected with the dock charging interface 30, one end of the second resistor R2, the gate of the first PMOSFET P1 and the drain of the second PMOSFET P2 respectively; the cathode of the first diode D1 is connected with one end of the first resistor R1 of which the other end is connected with the cathode of the second diode D2 and the source of the first PMOSFET P1 respectively; the drain of the first PMOSFET P1 is connected with one end of the third resistor R3, the input end of the phase inverter D3 and the gate of the second PMOSFET P2 respectively; the output end of the phase inverter D3 is connected with the gate of the third PMOSFET P3; the other ends of both the second resistor R2 and the third resistor R3 are grounded; the anode of the second diode D2 is connected with the device charging interface 20 and the drain of the third PMOSFET P3 respectively; and the sources of the second PMOSFET P2 and the third PMOSFET P3 are connected with the charging loop 40.

The working process of the automatic switching circuit 50 for the charging interface is further described below according to whether the charging interfaces are in place.

1) When both the dock charging interface 30 and the device charging interface 20 are not in place, the outputs of the automatic switching circuit 50 for the charging interface are at low level, which has no effect on the charging loop, therefore this state can be neglected.

2) When the dock charging interface 30 is in place while the device charging interface 20 is not in place, due to the isolation effect of the first diode D1 and the second diode D2, there is no voltage difference between the gate and source of the first PMOSFET P1, so the first PMOSFET P1 is cut off, the drain output of the first PMOSFET P1 is controlled to be low by the second resistor R2. There is voltage difference between the gate and the source of the second PMOSFET P2 under the effect of the body diode of the second PMOSFET P2, the second PMOSFET P2 is turned on and the dock charging interface 30 is connected with the charging loop 40. Under the inversion effect of the phase inverter D3, the third PMOSFET P3 is cut off, so the dock charging interface 30 is isolated from the device charging interface 20 and the interference caused by the mutual interference between two power supplies to the system software function of the device is avoided.

3) When the dock charging interface 30 is not in place while the device charging interface 20 is in place, due to the isolation effect of the first diode D1 and the second diode D2, there is voltage difference between the gate and the source of the first PMOSFET P1, the first PMOSFET P1 is turned on and the drain output of the first PMOSFET P1 is controlled to be high by the second resistor R2. Under the inversion effect of the phase inverter D3 and the action of the body diode of the third PMOSFET P3, the third PMOSFET P3 is turned on, the device charging interface 20 is connected with the charging loop 40, and the charging loop 40 is connected. Because the output of the first PMOSFET P1 is high and the PMOSFET P2 is cut off, the dock charging interface 30 is isolated from the device charging interface 20 and the interference caused by the mutual interference between two power supplies to the system software function of the device is avoided.

4) When both the dock charging interface 30 and the device charging interface 20 are in place, under the effect of the first diode D1, the second diode D2 and the first resistor R1, the dock charging interface 30 at the gate of the first PMOSFET P1 is isolated from the device charging interface 20 at the source of the first PMOSFET P1, thereby causing no effect therebetween. In this case, there is no voltage difference between the gate and source of the first PMOSFET P1, so the first PMOSFET P1 is cut off, the drain output of the first PMOSFET P1 is controlled to be low by the second resistor R2. There is voltage difference between the gate and source of the second PMOSFET P2 under the effect of the body diode of the second PMOSFET P2, therefore the second PMOSFET P2 is turned on, the dock charging interface 30 is connected with the charging loop 40 and the charging loop 40 is connected. Under the inversion effect of the phase inverter D3, the third PMOSFET P3 is cut off, so the dock charging interface 30 is isolated from the device charging interface 20 and the interference caused by the mutual interference between two power supplies to the system software function of the device is avoided.

What described above describes the preferred embodiments of the disclosure. However, as shown above, it should be understood that the disclosure is not limited to the form disclosed here and shall not be regarded as the exclusion of other embodiments, so that it can be applied to various other combinations, modifications and environments and can be modified by the instruction above or the technology or knowledge in the related fields within the concept scope of the disclosure. But the change and variation made by those skilled in the art within the scope of the disclosure shall be within the scope of protection of the claims of the disclosure.

What is claimed is:

1. An automatic switching apparatus for a charging interface of an internet device, characterized in that the automatic switching apparatus comprises a detection module and a switching module, wherein the detection module is configured to, when external power supply is connected into a device, judge whether a dock charging interface of the device is docked and send a judgment result to the switching module; and the switching module is configured to, when the dock charging interface of the device is docked, isolate a device charging interface of the device and at the same time, connect a charging loop of the device through the dock charging interface of the device; or, when the dock charging interface of the device is not docked, isolate the dock charging interface of the device and at the same time, connect the charging loop of the device through the device charging interface of the device;

wherein a circuit of the automatic switching apparatus comprises a first diode, a second diode, a first resistor, a second resistor, a third resistor, a phase inverter, a first P Metal Oxide Semiconductor Field Effect Transistor (PMOSFET), a second PMOSFET and a third PMOSFET, the anode of the first diode is connected with one end of the second resistor, the gate of the first PMOSFET and the drain of the second PMOSFET respectively; the cathode of the first diode is connected with one end of the first resistor; the other end of the first resistor is connected with the cathode of the second diode and the source of the first PMOSFET respectively; the drain of the first PMOSFET is connected with one end of the third resistor, the input end of the phase inverter and the gate of the second PMOSFET respectively; the output end of the phase inverter is connected with the gate of the third PMOSFET; the other end of the second resistor and the other end of the third resistor are grounded; and the anode of the second diode is connected with the drain of the third PMOSFET.

2. The automatic switching apparatus according to claim 1, characterized in that the detection module is further configured to detect whether the external power supply is connected into the device.

3. An internet device, comprising a device charging interface, a dock charging interface and a charging loop, characterized by further comprising an automatic switching apparatus for a charging interface, wherein the automatic switching apparatus for the charging interface comprises a detection module and a switching module, wherein the detection module is configured to, when external power supply is connected into the device, judge whether the dock charging interface is docked and send a judgment result to the switching module; and the switching module is configured to, when the dock charging interface is docked, isolate the device charging interface and at the same time, connect the charging loop through the dock charging interface; or, when the dock charging interface is not docked, isolate the dock charging interface and at the same time, connect the charging loop through the device charging interface;

wherein a circuit of the automatic switching apparatus comprises a first diode, a second diode, a first resistor, a second resistor, a third resistor, a phase inverter, a first P Metal Oxide Semiconductor Field Effect Transistor (PMOSFET), a second PMOSFET and a third PMOSFET, the anode of the first diode is connected with the dock charging interface, one end of the second resistor, the gate of the first PMOSFET and the drain of the second PMOSFET respectively; the cathode of the first diode is connected with one end of the first resistor; the other end of the first resistor is connected with the cathode of the second diode and the source of the first PMOSFET respectively; the drain of the first PMOSFET is connected with one end of the third resistor, the input end of the phase inverter and the gate of the second PMOSFET respectively; the output end of the phase inverter is connected with the gate of the third PMOSFET; the other end of the second resistor and the other end of the third resistor are grounded; the anode of the second diode is connected with the device charging interface and the drain of the third PMOSFET respectively; and the source of the second PMOSFET and the source of the third PMOSFET are connected with the input end of the charging loop.

4. The internet device according to claim 3, characterized in that the detection module is further configured to detect whether the external power supply is connected into the device.

* * * * *